United States Patent
Ahn et al.

(10) Patent No.: US 9,363,050 B2
(45) Date of Patent: Jun. 7, 2016

(54) METHOD AND DEVICE FOR PERFORMING A RANDOM ACCESS PROCESS

(75) Inventors: Joon Kui Ahn, Anyang-si (KR); Suck Chel Yang, Anyang-si (KR); Min Gyu Kim, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 157 days.

(21) Appl. No.: 14/128,406

(22) PCT Filed: Jun. 21, 2012

(86) PCT No.: PCT/KR2012/004890
§ 371 (c)(1),
(2), (4) Date: Dec. 20, 2013

(87) PCT Pub. No.: WO2012/177054
PCT Pub. Date: Dec. 27, 2012

(65) Prior Publication Data
US 2014/0198746 A1    Jul. 17, 2014

Related U.S. Application Data

(60) Provisional application No. 61/500,104, filed on Jun. 22, 2011, provisional application No. 61/511,982, filed on Jul. 26, 2011, provisional application No. 61/512,372, filed on Jul. 27, 2011, provisional application No. 61/521,381, filed on Aug. 9, 2011, provisional application No. 61/521,724, filed on Aug. 9, 2011, provisional application No. 61/538,930, filed on Sep. 25, 2011, provisional application No. 61/546,535, filed on Oct. 12, 2011, provisional application No. 61/559,155, filed on Nov. 14, 2011, provisional application No. 61/591,278, filed on Jan. 27, 2012.

(51) Int. Cl.
*H04W 4/00* (2009.01)
*H04L 5/00* (2006.01)
*H04W 74/08* (2009.01)
*H04W 74/00* (2009.01)
*H04W 74/04* (2009.01)

(52) U.S. Cl.
CPC .............. *H04L 5/0032* (2013.01); *H04L 5/001* (2013.01); *H04L 5/0053* (2013.01); *H04W 74/0833* (2013.01); *H04W 74/006* (2013.01); *H04W 74/04* (2013.01)

(58) Field of Classification Search
CPC ......... H04L 5/00; H04L 5/001; H04L 5/0005; H04L 5/0053; H04L 5/0032; H04W 74/00; H04W 74/004; H04W 74/006; H04W 74/0833; H04W 72/00; H04W 72/02; H04W 72/04; H04W 72/0406; H04W 72/1278; H04W 74/0006; H04W 74/002
See application file for complete search history.

(56) References Cited

U.S. PATENT DOCUMENTS

| | | | |
|---|---|---|---|
| 8,705,467 B2 * | 4/2014 | Korhonen et al. | 370/329 |
| 2010/0067470 A1 | 3/2010 | Damnjanovic et al. | |
| 2010/0240372 A1 | 9/2010 | Wu | |
| 2011/0103332 A1 | 5/2011 | Kuo | |
| 2011/0105107 A1 * | 5/2011 | Kwon et al. | 455/422.1 |

FOREIGN PATENT DOCUMENTS

| KR | 10-2010-0105438 A | 9/2010 |
|---|---|---|
| KR | 10-2011-0053386 A | 5/2011 |

* cited by examiner

*Primary Examiner* — Anh Ngoc Nguyen
(74) *Attorney, Agent, or Firm* — Birch, Stewart, Kolasch & Birch, LLP

(57) ABSTRACT

The preset invention relates to a method and device for performing a random access process in a wireless communication system. A terminal transmits a random access preamble in an activated secondary cell, and receives a random access response including uplink resource allocation in a primary cell. The terminal transmits a scheduled message by using the uplink resource allocation in the activated secondary cell.

14 Claims, 8 Drawing Sheets

FIG. 8

METHOD AND DEVICE FOR PERFORMING A RANDOM ACCESS PROCESS

CROSS-REFERENCE TO RELATED APPLICATIONS

This application is the National Phase of PCT/KR2012/004890 filed on Jun. 21, 2012, which claims priority under 35 U.S.C. 119(e) to U.S. Provisional Application No. 61/500,104 filed on Jun. 22, 2011; U.S. Provisional Application No. 61/511,982 filed on Jul. 26, 2011; U.S. Provisional Application No. 61/512,372 filed on Jul. 27, 2011; U.S. Provisional Application No. 61/521,381 filed on Aug. 9, 2011; U.S. Provisional Application No. 61/521,724 filed on Aug. 9, 2011; U.S. Provisional Application No. 61/538,930 filed on Sep. 25, 2011; U.S. Provisional Application No. 61/546,535 filed on Oct. 12, 2011; U.S. Provisional Application No. 61/559,155 filed on Nov. 14, 2011 and U.S. Provisional Application No. 61/591,278 filed on Jan. 27, 2012, all of which are hereby expressly incorporated by reference into the present application.

BACKGROUND OF THE INVENTION

1. Field of the Invention

The present invention concerns wireless communication, and more specifically, to a method and apparatus for performing a random access procedure in a wireless communication system.

2. Related Art

3GPP (3rd Generation Partnership Project) TS (Technical Specification) Release 8-based LTE (long term evolution) is a promising, next generation mobile communication standard.

As set forth in 3GPP TS 36.211 V8.7.0 (2009-05) "Evolved Universal Terrestrial Radio Access (E-UTRA); Physical Channels and Modulation (Release 8)," physical channels, in 3GPP LTE, may be categorized into downlink channels such as PDSCH (Physical Downlink Shared Channel) and PDCCH (Physical Downlink Control Channel) and uplink channels such as PUSCH (Physical Uplink Shared Channel) 와 PUCCH (Physical Uplink Control Channel).

In order to reduce interference in uplink transmission between terminals, it is critical for a base station to maintain the terminals' uplink time alignment. A terminal may be positioned in some area of a cell, and the arrival time of an uplink signal transmitted from a terminal to a base station may vary depending on the position of each terminal. The arrival time of a terminal positioned at a cell edge is longer than that of a terminal positioned at a center of the cell. In contrast, the arrival time of the terminal positioned at the center of the cell is shorter than that of the terminal positioned at the cell edge.

A base station needs to perform scheduling that allows uplink signals transmitted from terminals in a cell to be received within a boundary at every time so as to reduce interference between terminals. The base station should properly adjust transmission timing of each terminal, and such adjustment is referred to as uplink time alignment. A random access procedure is one of processes for maintaining uplink time alignment.

Recently, use of a plurality of serving cells has been introduced to offer a higher data rate. The existing random access procedure has been designed considering only one serving cell.

SUMMARY OF THE INVENTION

The present invention provides a method and apparatus for performing random access considering a plurality of serving cells.

In an aspect, a method of performing a random access procedure in a wireless communication system is provided. The method comprises receiving multi-cell configuration information configuring at least one secondary cell by a terminal; receiving activation information activating one of the at least one secondary cell by the terminal; transmitting a random access preamble in the activated secondary cell by the terminal; receiving a random access response including an uplink resource allocation in a primary cell by the terminal; and transmitting a scheduled message using the uplink resource allocation in the activated secondary cell by the terminal.

The random access response may include a TAC (Timing Advance Command) for uplink time alignment.

In another aspect, an apparatus performing a random access procedure in a wireless communication system is provided. The apparatus comprises an RF (radio frequency) unit transmitting and receiving a radio signal; and a processor connected with the RF unit, wherein the processor receives multi-cell configuration information configuring at least one secondary cell; receiving activation information activating one of the at least one secondary cell; transmitting a random access preamble in the activated secondary cell; receiving a random access response including an uplink resource allocation in a primary cell; and transmitting a scheduled message using the uplink resource allocation in the activated secondary cell.

A method of performing a random access procedure when a secondary cell is configured and a random access preamble is transmitted in the secondary cell is suggested.

DESCRIPTION OF EXEMPLARY EMBODIMENTS

The User Equipment (UE) may be stationary or mobile and may also be referred to as MS (mobile station), MT (mobile terminal), UT (user terminal), SS (subscriber station), Terminal (wireless device), PDA (personal digital assistant), wireless modem, handheld device, etc.

The base station (BS) is typically a fixed station that communicates with a terminal and may also be referred to as eNB (evolved-NodeB), BTS (Base Transceiver System), Access Point, etc.

Hereinafter, the present invention is described based on 3GPP (3rd Generation Partnership Project) TS (Technical Specification) Release 8-based 3GPP LTE (long term evolution). However, this is merely an example, and the present invention may also apply to various wireless communication networks.

Figure 1:
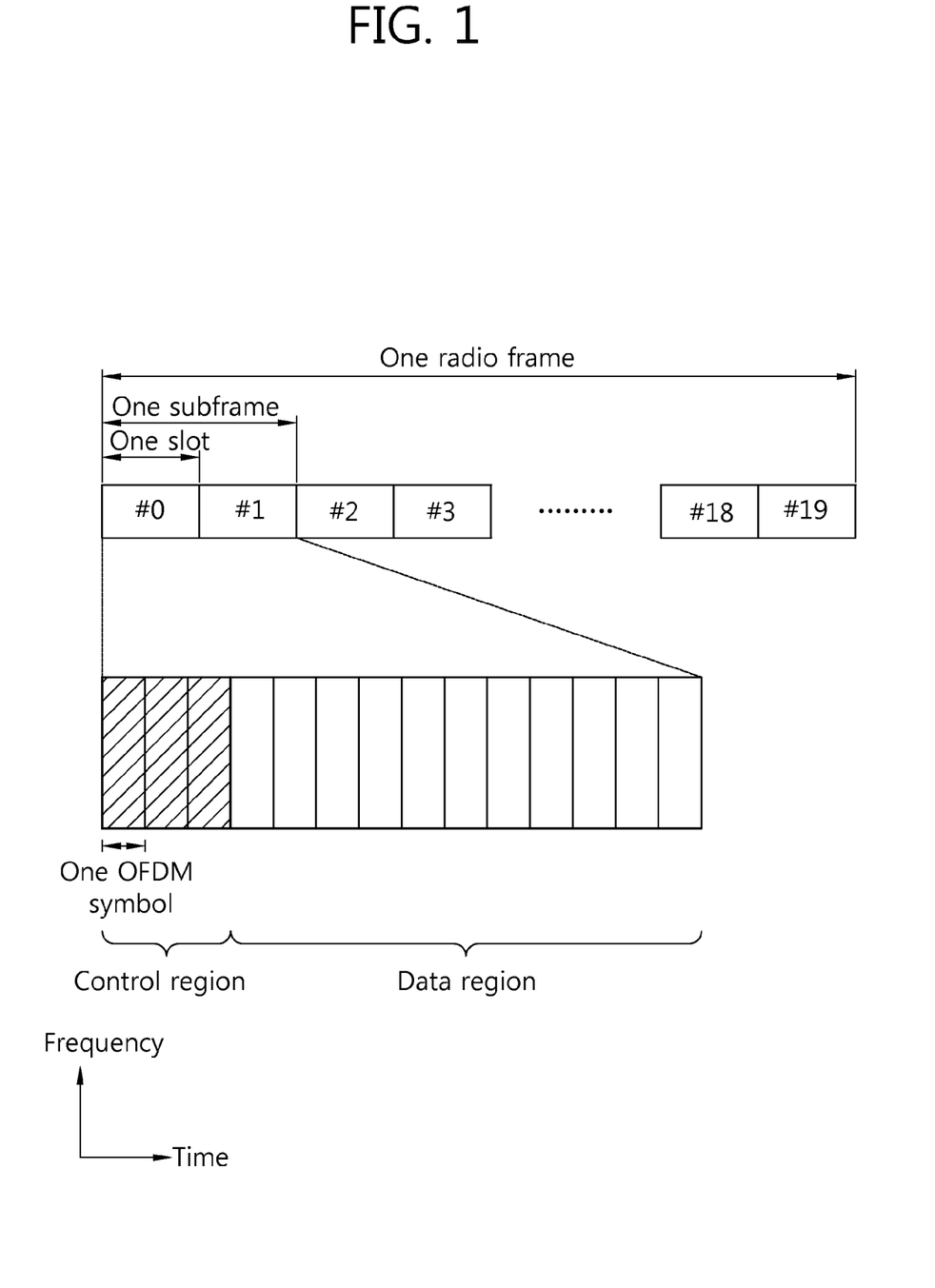
FIG. 1 shows the structure of a downlink radio frame in 3GPP LTE.

FIG. 1 sows the structure of a downlink radio frame in 3GPP LTE. This may refer to 3GPP TS 36.211 V8.7.0 (2009-

05) "Evolved Universal Terrestrial Radio Access (E-UTRA); Physical Channels and Modulation (Release 8)," Ch. 6.

A radio frame includes ten sub-frames indexed 0 to 9. One sub-frame includes two consecutive slots. The time taken for one sub-frame to be transmitted is a TTI (transmission time interval). For example, the length of one sub-frame may be 1 ms, and the length of one slot may be 0.5 ms.

One slot may include, in the time domain, a plurality of OFDM (orthogonal frequency division multiplexing) symbols. The term of OFDM symbol is used merely to represent one symbol period in the time domain because 3GPP LTE adopts OFDMA (orthogonal frequency division multiple access) on downlink, and thus, this does not limit the type and name of multiple access schemes. For example, the OFDM symbol may also be referred to as SC-FDMA (single carrier-frequency division multiple access) symbol or symbol period.

One slot includes seven OFDM symbols for purposes of description. However, depending on the length of a CP (Cyclic Prefix), the number of OFDM symbols included in one slot may vary. According to 3GPP TS 36.211 V8.7.0, one slot includes seven OFDM symbols in a normal CP and six OFDM symbols in an extended CP.

The resource block (RB) is a basis for resource allocation and includes a plurality of sub-carriers in one slot. For example, in case one slot includes seven OFDM symbols in the time domain and one resource block includes 12 sub-carriers in the frequency domain, the resource block may include 7×12 resource elements (REs).

The DL (downlink) sub-frame is separated into a control region and a data region in the time domain. The control region includes up to three first OFDM symbols in the first slot in the sub-frame. However, the number of OFDM symbols included in the control region may vary. In the control region, a PDCCH (Physical Downlink Control Channel) and other control channels are allocated, and in the data region, a PDSCH is allocated.

As set forth in 3GPP TS 36.211 V8.7.0, physical channels, in 3GPP LTE, may be separated into data channels such as a PDSCH (Physical Downlink Shared Channel) and a PUSCH (Physical Uplink Shared Channel) and control channels, such as a PDCCH (Physical Downlink Control Channel), a PCFICH (Physical Control Format Indicator Channel), a PHICH (Physical Hybrid-ARQ Indicator Channel) and a PUCCH (Physical Uplink Control Channel).

The PCFICH which is transmitted in the first OFDM symbol of the sub-frame carries a CFI (control format indicator) regarding the number of OFDM symbols (i.e., size of the control region) used for transmission of control channels in the sub-frame. The terminal receives the CFI over the PCFICH and then monitors the PDCCH.

Unlike the PDCCH, the PCFICH is transmitted through a fixed PCFICH resource of the sub-frame without using blind decoding.

The PHICH carries an ACK (positive-acknowledgement)/NACK (negative-acknowledgement) signal for uplink HARQ (hybrid automatic repeat request). The ACK/NACK signal for UL (uplink) data over the PUSCH transmitted by the terminal is transmitted over the PHICH.

The PBCH (Physical Broadcast Channel) is transmitted through first four OFDM symbols in the second slot of the first sub-frame of the radio frame. The PBCH carries system information necessary for the terminal to communicate with the base station. The system information transmitted through the PBCH is referred to as MIB (master information block). In comparison, the system information transmitted over the PDSCH indicated by the PDCCH is referred to as SIB (system information block).

The control information transmitted through the PDCCH is referred to as downlink control information (DCI). The DCI may include resource allocation of the PDSCH (also referred to as DL (downlink) grant), resource allocation of the PUSCH (also referred to as UL (uplink) grant), set of transmit power control commands for individual UEs in any UE group and/or VoIP (Voice over Internet Protocol) activation.

In 3GPP LTE, blind decoding is used for detecting the PDCCH. Blind decoding is a scheme in which a desired identifier is demasked to the CRC of a received PDCCH (referred to as a candidate PDCCH) and CRC error check is conducted so as to identify whether the corresponding PDCCH is its own control channel.

After determining the PDCCH format according to the DCI to be sent to the terminal, the base station adds a CRC (Cyclic Redundancy Check) to the DCI and masks the CRC with a unique identifier (which is referred to as RNTI (Radio Network Temporary Identifier)) depending on the owner or purpose of the PDCCH.

The control region in the sub-frame includes a plurality of CCEs (control channel elements). The CCE is a basis for logical allocation which is used to provide a PDCCH with a coding rate according to the state of a radio channel and corresponds to a plurality of REGs (resource element groups). The REG includes a plurality of resource elements. According to the relationship between the number of CCEs and the coding rate provided by the CCEs, the format of the PDCCH and the possible number of bits of the PDCCH are determined.

One REG includes four REs and one CCE includes nine REGs. In order to configure one PDCCH, $\{1, 2, 4, 8\}$ CCEs may be used, and each element of $\{1, 2, 4, 8\}$ is referred to as a CCE aggregation level.

The number of CCEs used for transmission of the PDCCH is determined by the base station according to the channel state. For example, for a terminal having a good downlink channel state, one CCE may be used for transmitting the PDCCH. For a terminal having a poor downlink channel state, eight CCEs may be used for transmitting the PDCCH.

A control channel constituted of one or more CCEs performs interleaving on a per-REG basis, and after a cell ID (identifier)-based cyclic shift is performed, it is mapped with a physical resource.

Figure 2:
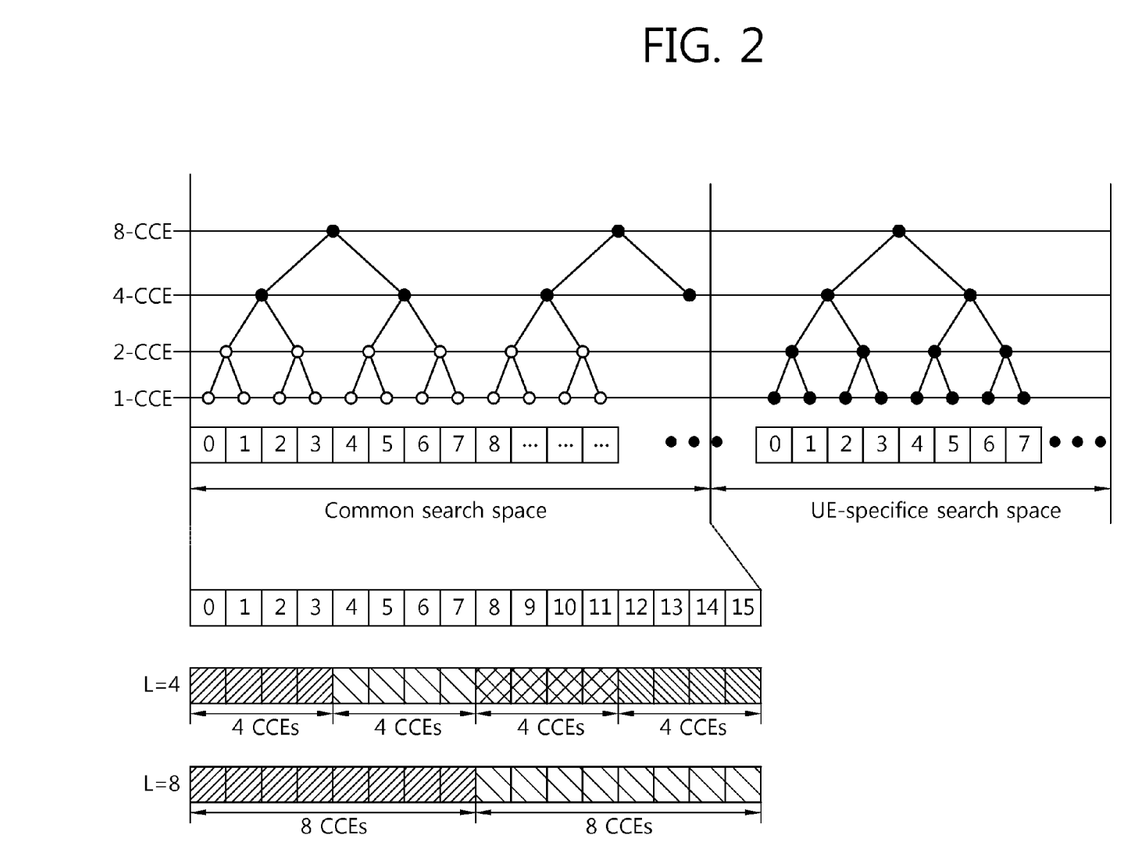
FIG. 2 shows an example of monitoring a PDCCH.

FIG. 2 shows an example of monitoring a PDCCH. For this, refer to 3GPP TS 36.213 V8.7.0 (2009-05), Ch. 9.

In 3GPP LTE, blind decoding is used for detecting the PDCCH. Blind decoding is a scheme in which a desired identifier is demasked to the CRC of a received PDCCH (referred to as a candidate PDCCH) and CRC error check is conducted so as to identify whether the corresponding PDCCH is its own control channel. The terminal is not aware of what CCE aggregation level or DCI format its PDCCH uses at what position in the control region.

A plurality of PDCCHs may be transmitted in one sub-frame. The terminal monitors a plurality of PDCCHs at every sub-frame. Here, the term of monitoring refers to the terminal attempting to decode a PDCCH to be monitored, per the format of the PDCCH.

In 3GPP LTE, a search space is used for reducing load posed by blind decoding. The search space may be CCEs' monitoring set for a PDCCH. The terminal monitors the PDCCH in the search space.

The search space includes a common search space and a UE-specific search space. The common search space is a space for searching a PDCCH having common control information and consists of 16 CCEs, CCE index 0 to 15, and supports PDCCHs having a CCE aggregation level of $\{4, 8\}$.

However, a PDCCH (DCI formats 0, or 1A) for carrying UE-specific information may be transmitted even in the common search space. The UE-specific search space supports PDCCHs having a CCE aggregation level of {1, 2, 4, 8}.

The following table represents the number of PDCCH candidates that are monitored by the terminal.

TABLE 1

| Search Space Type | Aggregation level L | Size [in CCEs] | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

The size of a search space is determined by the Table 1 above, and the start point of a search space is defined differently for each of the common search space and UE-specific search space. The start point of the common search space is fixed regardless of any sub-frame, but the start point of the UE-specific search space may vary per sub-frame depending on the terminal identifier (for example, C-RNTI), CCE aggregation level and/or slot number in a radio frame. In case the start point of the UE-specific search space is positioned in the common search space, the UE-specific search space and the common search space may overlap.

In an aggregation level L∈{1, 2, 3, 4}, search space $S^{(L)}_k$ is defined as a set of PDCCH candidates. The CCE corresponding to PDCCH candidate m in search space $S^{(L)}_k$ is given as follows:

$$L \cdot \{(Y_k + m) \bmod \lfloor N_{CCE,k}/L \rfloor\} + i \quad \text{[Equation 1]}$$

Here, i=0, 1, ..., L−1, m=0, ..., $M^{(L)}$−1, and $N_{CCE,k}$ is the total number of CCEs that may be used for transmission of PDCCHs in the control region of sub-frame k. The control region includes a set of CCEs numbered from 0 to $N_{CCE,k}$−1. $M^{(L)}$ is the number of PDCCH candidates in CCE aggregation level L in the given search space.

In the common search space, $Y_k$ is set as 0 for two aggregation levels, L=4 and L=8.

In the UE-specific search space of aggregation level L, variable $Y_k$ is defined as follows:

$$Y_k = (A \cdot Y_{k-1}) \bmod D \quad \text{[Equation 2]}$$

Here, $Y_{-1} = n_{RNTI} \neq 0$, A=39827, D=65537, k=floor($n_s$/2), and $n_s$ is a slot number in the radio frame.

In 3GPP LTE, transmission of a downlink transmission block is performed in a pair of PDCCH and PDSCH. Transmission of an uplink transmission block is performed in a pair of PDCCH and PUSCH. For example, the terminal receives a downlink transmission block over a PDSCH indicated by a PDCCH. The terminal receives a downlink resource allocation over a PDCCH by monitoring the PDCCH in a downlink sub-frame. The terminal receives a downlink transmission block over a PDSCH indicated by the downlink resource allocation.

A multi-carrier system is now described.

A 3GPP LTE system supports the situation where a downlink bandwidth is set to differ from an uplink bandwidth, but this assumes a single component carrier (CC). The 3GPP LTE system supports up to 20 MHz, and the uplink bandwidth may differ from the downlink bandwidth. However, only one CC is supported for each of uplink and downlink.

Spectrum aggregation (also referred to as bandwidth aggregation or carrier aggregation) is to support a plurality of CCs. For example, if five CCs are assigned as granularity of the basis for carrier having a 20 MH bandwidth, a bandwidth up to 100 Mhz may be supported.

One DL CC or a pair of UL CC and DL CC may correspond to one cell. Accordingly, a terminal communicating with a base station through a plurality of DL CCs may be referred to as being provided with services from a plurality of serving cells.

Figure 3:
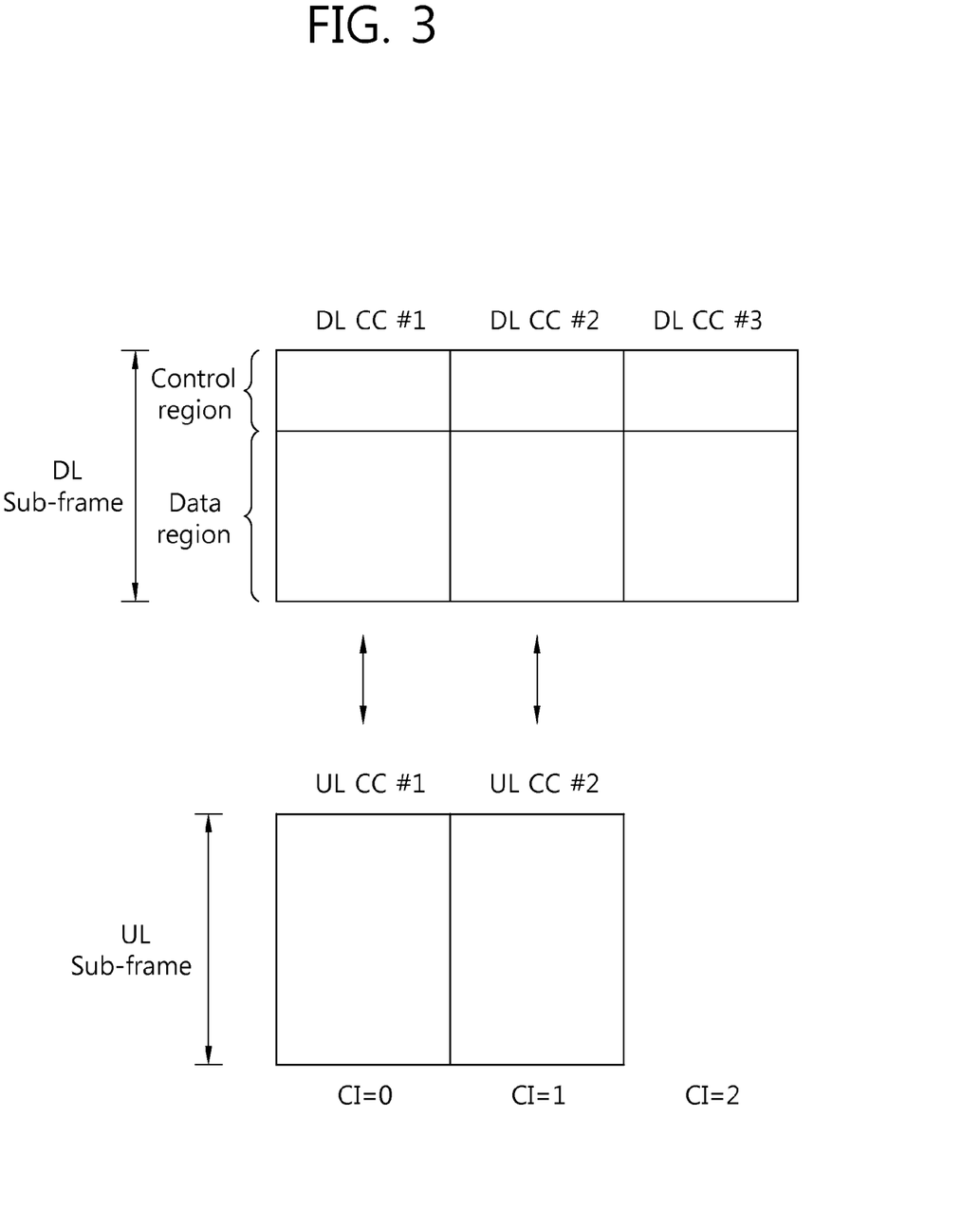
FIG. 3 shows an example of a multi-carrier.

FIG. 3 shows an example of a multi-carrier.

Three DL CCs and three UL CCs are shown. However, the number of DL CCs and UL CCs is not limited. The PDCCH and the PDSCH are independently transmitted in each DL CC, and the PUCCH and PUSCH are independently transmitted in each UL CC. Since three pairs of DL CC and UL CC are defined, the terminal may be referred to as being provided with services from three serving cells.

The terminal monitors the PDCCH in the plurality of DL CCs and may simultaneously receive DL transmission blocks through the plurality of DL CCs. The terminal may simultaneously transmit a plurality of UL transmission blocks through the plurality of UL CCs.

Assume that a pair of DL CC#1 and UL CC#1 is a first serving cell, a pair of DL CC#2 and UL CC#2 is a second serving cell, and DL CC#3 is a third serving cell. Each serving cell may be identified through a cell index (CI). The CI may be unique in a cell or may be UE-specific. Here, an example is illustrated where CI=0, 1, 2 is assigned to the first to third serving cells.

The serving cells may be separated into a primary cell and a secondary cell. The primary cell operates at a first frequency and is a cell designated as the primary cell when the terminal performs an initial connection establishment process, initiates a connection reestablishment process, or performs handover. The primary cell is also referred to as a reference cell. The secondary cell operates at a secondary frequency and may be configured after an RRC connection is established and may be used for providing additional radio resources. At least one primary cell is always configured, and the secondary cell may be added/modified/released by an upper layer message (e.g., RRC message).

The CI of the primary cell may be fixed. For example, the lowest CI may be designated as the CI of the primary cell. Hereinafter, the CI of primary cell is 0, and the CI of secondary cell is sequentially assigned from 1.

The terminal may monitor the PDCCH through a plurality of serving cells. However, although there are N serving cells, the base station may be configured to monitor the PDCCH for M serving cells (M≤N). Further, the base station may be configured to first monitor the PDCCH for L serving cells (L≤M≤N).

Two scheduling schemes in the multi-carrier system may be available.

First, according to per-CC scheduling, PDSCH scheduling is performed only in each serving cell. The PDCCH of a primary cell schedules the PDSCH of the primary cell, and the PDCCH of a secondary cell schedules the PDSCH of the secondary cell. Accordingly, the existing 3GPP LTE PDCCH-PDSCH architectures may be used as are.

Second, according to cross-CC scheduling, the PDCCH of each serving cell may schedule not only its PDSCH but also the PDSCHs of other serving cells.

The serving cell where the PDCCH is transmitted is referred to as a scheduling cell, and the serving cell where the PDSCH scheduled through the PDCCH of the scheduling cell is referred to as a scheduled cell. The scheduling cell and the scheduled cell, respectively, may be briefly referred to as scheduling CC and scheduled CC. According to per-CC scheduling, the scheduling cell is the same as the scheduled cell. According to cross-CC scheduling, the scheduling cell may be the same or different from the scheduled cell.

A CIF (carrier indicator field) is introduced in the DCI for cross-CC scheduling. The CIF includes the CI of the cell having a scheduled PDSCH. It can be said that the CIF indicates the CI of a scheduled cell. According to per-CC scheduling, the DCI of the PDCCH does not include a CIF. According to cross-CC scheduling, a CIF is included in the DCI of the PDCCH.

The base station may configure per-CC scheduling or cross-CC scheduling cell-specifically or UE-specifically. For example, the base station may configure cross CC scheduling in a specific terminal with an upper layer message such as an RRC message.

Although there is a plurality of serving cells, the base station may be rendered to monitor the PDCCH only in a specific serving cell so as to reduce load due to blind decoding. The cell activated to monitor the PDCCH is referred to as activated cell (or monitoring cell).

Figure 4:
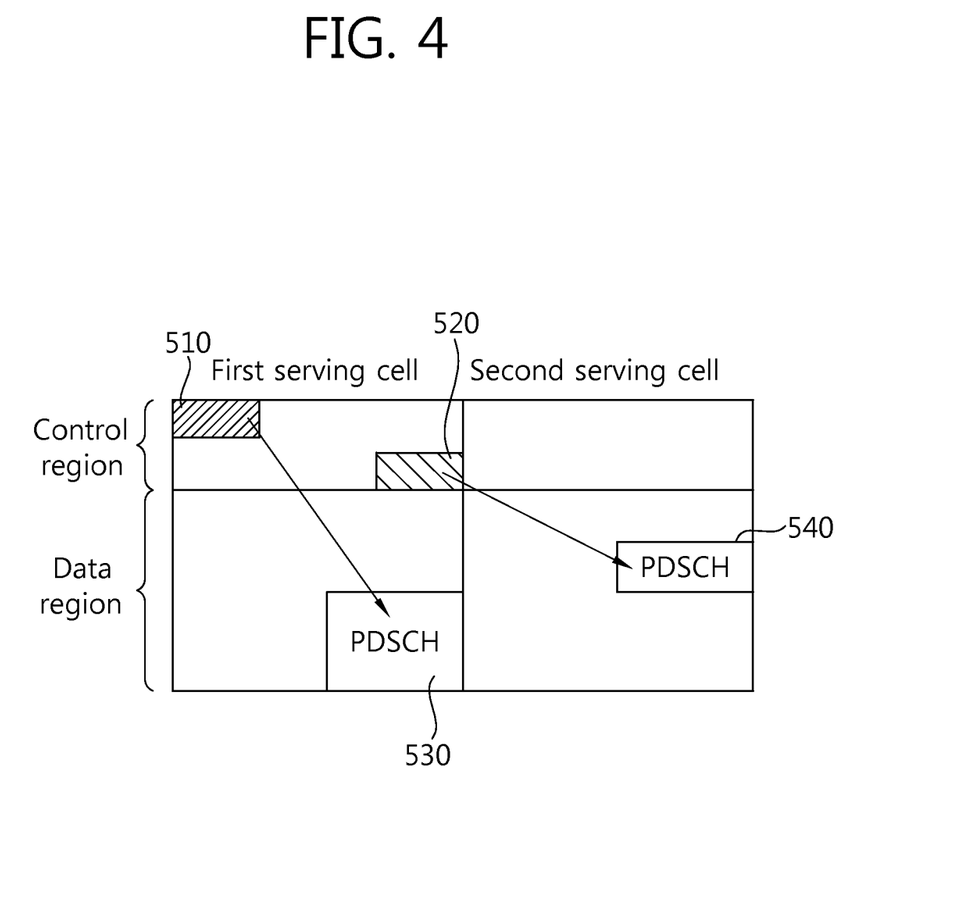
FIG. 4 shows an example of cross-CC scheduling.

FIG. 4 shows an example of cross CC scheduling.

The terminal detects a PDCCH 510. The terminal then receives a DL transmission block on a PDSCH 530 based on the DCI on the PDCCH 510. Although cross CC scheduling is configured, a pair of PDCCH-PDSCH in the same cell may be used.

The terminal detects a PDCCH 520. Assume that the CIF in the DCI on the PDCCH 520 indicates a secondary serving cell. The terminal receives the DL transmission block on the PDSCH 540 of the secondary serving cell.

Figure 5:
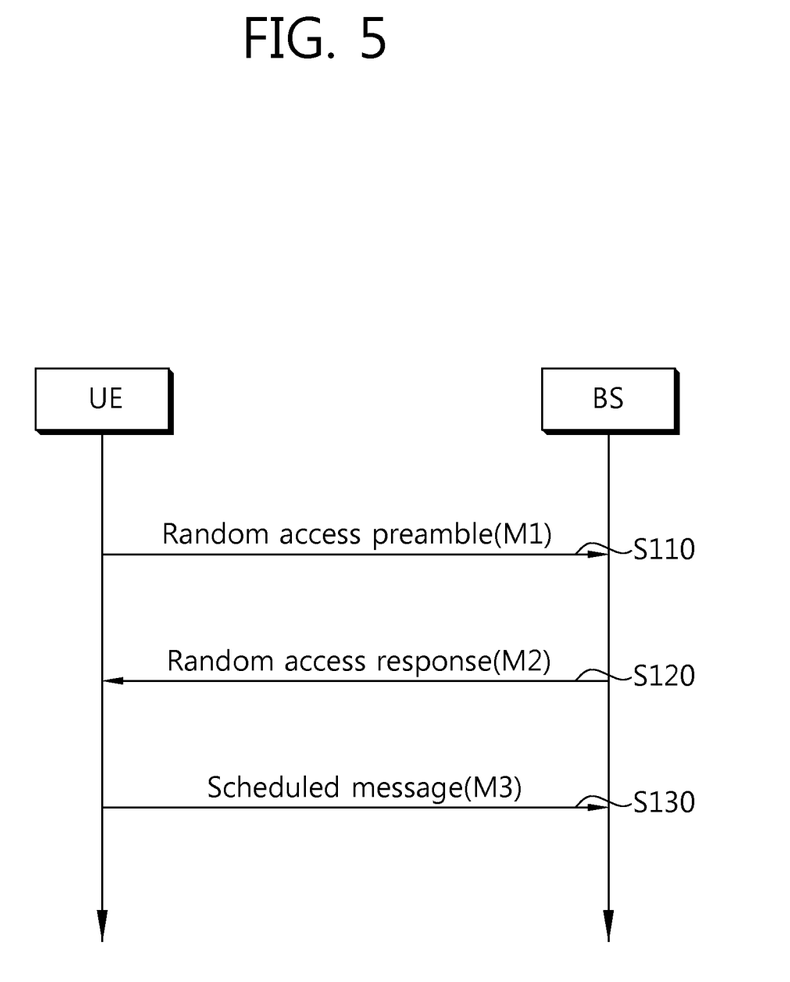
FIG. 5 is a flowchart illustrating a random access procedure in 3GPP LTE.

FIG. 5 is a flowchart illustrating a random access procedure in 3GPP LTE. The random access procedure is used for a terminal to obtain UL sync with a base station or to be allocated with a UL radio resource.

The terminal receives a root index and a PRACH (physical random access channel) configuration index from the base station. There are 64 candidate random access preambles defined by a ZC (Zadoff-Chu) sequence for each cell, and the root index is a logical index for the terminal to generate 64 candidate random access preambles.

Transmission of a random access preamble is limited by a specific time and frequency resource for each cell. The PRACH configuration index denotes a preamble format and a specific sub-frame where the random access preamble may be transmitted.

The following table shows an example of random access configuration set forth in 3GPP TS 36.211 V8.7.0 (2009-05), Ch. 5.7.

TABLE 2

| PRACH configuration index | Preamble format | System frame number | Sub-frame number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |

The terminal transmits a random access preamble, which has been arbitrarily selected, to the base station (S110). The terminal selects one of the 64 candidate random access preambles. The terminal then selects a corresponding sub-frame by the PRACH configuration index. The terminal transmits the selected random access preamble in the selected sub-frame.

When receiving the random access preamble, the base station sends a random access response (RAR) to the terminal (S120). The random access response is detected in two steps. First, the terminal detects a masked PDCCH with an RA-RNTI (random access-RNTI). The terminal then receives a random access response in an MAC (Medium Access Control) PDU (Protocol Data Unit) on the PDSCH indicated by the DL grant on the detected PDCCH.

Figure 6:
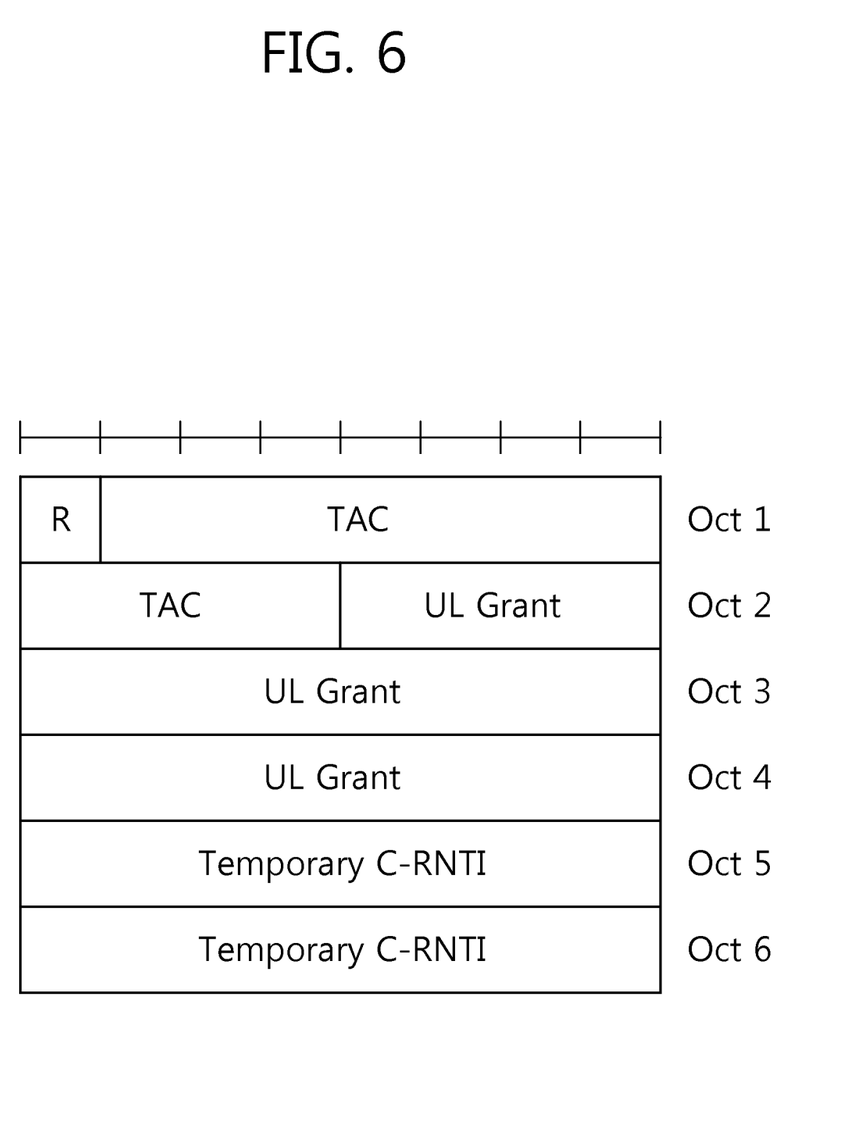
FIG. 6 shows an example of a random access response.

FIG. 6 shows an example of a random access response.

The random access response may include a TAC (Timing Advance Command), a UL grant, and a temporary C-RNTI.

The TAC is information indicating a time sync value, which is sent from the base station to the terminal in order to maintain UL time sync (time alignment). The terminal updates UL transmission timing using the time sync value. If the terminal updates time sync, a time sync timer (time alignment timer) starts or restarts. Only when the time sync timer operates, the terminal may perform UL transmission.

The UL grant is a UL resource used for transmitting a scheduling message that is to be described later.

Turning back to FIG. 5, the terminal transmits, to the base station, a message scheduled per the UL grant in the random access response (S130).

Hereinafter, the random access preamble, random access response, and scheduled message are also referred to as M1 message, M2 message, and M3 message, respectively.

3GPP LTE considers a single serving cell and does not support a plurality of serving cells. If a random access procedure is performed only in one serving cell (e.g., primary cell), an existing random access procedure may be used as is, but if the channel state between serving cells varies, a random access procedure may need to be conducted in the secondary cell.

If a random access preamble is transmitted in the secondary cell, ambiguity may arise. After the terminal transmits M1 message in the secondary cell, it is unclear in which cell M2 message is received and in which cell M3 message is to be transmitted.

Hereinafter, a method for monitoring M2 message and a scheme for transmitting M3 are suggested.

Hereinafter, assume that CSS (common search space) is present only in the primary cell and USS (UE-specific search space) is present in the primary and secondary cell.

Figure 7:
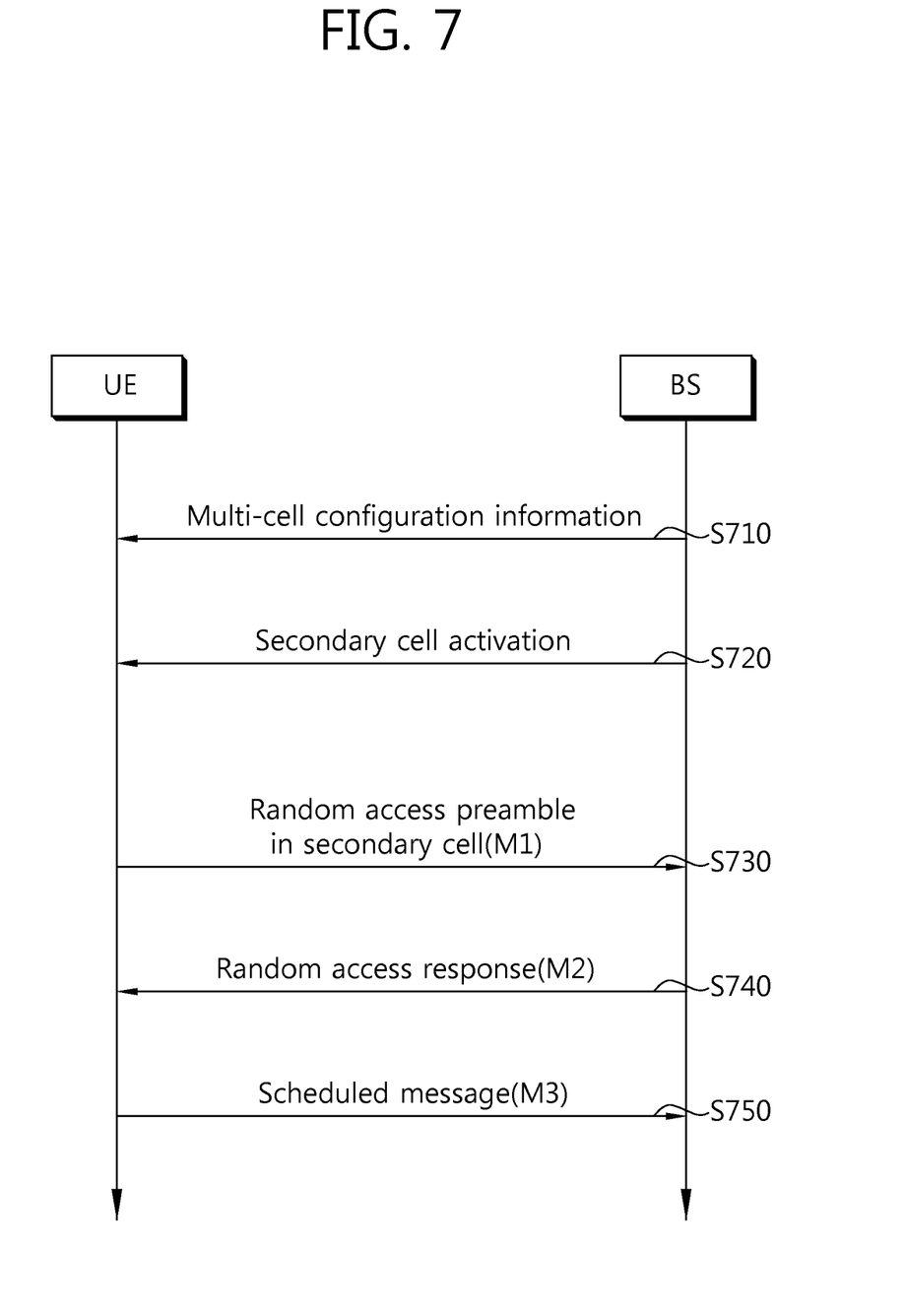
FIG. 7 is a flowchart illustrating a random access procedure according to an embodiment of the present invention.

FIG. 7 is a flowchart illustrating a random access procedure according to an embodiment of the present invention.

The terminal receives multi-cell configuration information from the base station (S710). The multi-cell configuration information may be included in an RRC message such as an RRC connection reconfiguration message. The multi-cell configuration information may be transmitted through a primary cell.

The multi-cell configuration information may include information for adding, modifying, and/or releasing one or more secondary cells. The multi-cell configuration information may include information on the cell index of the secondary cell, PCI (physical cell identity) of the secondary cell, and/or carrier frequency of the secondary cell.

The terminal receives activation information for activating or deactivating the secondary cell (S720). For example, assume that two secondary cells corresponding to cell indexes 1 and 2 are configured from the multi-cell configuration information. The activation information may include a bit indicating activation or deactivation of the secondary cell with cell index 1 and a bit indicating activation or deactivation of the secondary cell with cell index 2.

Hereinafter, assume that one secondary cell is configured and activated.

The terminal transmits a random access preamble (M1) in the secondary cell (S730). The base station may assign a random access resource for secondary cell to the terminal. For example, a root index for generating candidate random access preambles for secondary cell and a PRACH configuration index for secondary cell may be given from the base station.

The base station transmits a random access response (M2) to the terminal (S750). M2 may include at least any one of a TAC, a UL grant, and a temporary C-RNTI, as shown in FIG. 6. The TAC may independently apply per cell or cell group assigned to the terminal. At this time, the cell group to which the same TAC applies is denoted as TAG (timing advance group) for convenience.

In order to define a serving cell where M2 may be transmitted and a search space for scheduling M2, the following scheme is suggested.

In a first embodiment, M2 may be transmitted only in the primary cell. The PDCCH for scheduling M2 may be monitored only in the CSS of the primary cell. The CIF value in the PDCCH corresponding to M2 may be disregarded or may always be set as a cell index value (e.g., 0) that indicates the primary cell. The random access response may include the items described above in connection with FIG. 6.

In a second embodiment, M2 may be transmitted in an activated serving cell. M2 may be transmitted in the primary cell and activated secondary cell. The PDCCH for scheduling M2 may be monitored in at least one of the CSS of the primary cell, USS of the primary cell, and USS of the secondary cell. Additionally, in order to schedule M2 transmitted in the secondary cell in per-CC scheduling, the PDCCH may be monitored in the CSS of the corresponding secondary cell.

M2 corresponding to M1 transmitted through a specific serving cell may be limited as monitoring the PDCCH only in the search space for scheduling the specific cell. The CIF value of the PDCCH for scheduling M2 may be neglected or may be defined to indicate the cell index where the corresponding M2 is transmitted.

The search space where the PDCCH for scheduling M2 is transmitted may be limited as search of cells where M1 may be transmitted. The cells where M1 may be transmitted being limited may be preferable.

When the PDCCH for scheduling M2 is monitored in USS, the PDCCH may be identified with a C-RNTI, not RA-RNTI. The terminal needs to be able to be aware of whether the PDCCH received through the corresponding USS schedules M2 or another PDSCH.

It may be assumed that, for the terminal, all or some of DCI formats are not scheduled for PDSCH except for M2 during the period (which is referred to as RA (random access) monitoring period) for monitoring the random access response after the random access preamble has been transmitted in the secondary cell. That is, the DCI formats for PDSCH scheduling, which is received during the RA monitoring period, are assumed to be all for M2 scheduling. The DCI formats for M2 scheduling may be DCI format 1A and/or DCI format 1C.

The RA monitoring period may be during the k+nth (n>0) DL sub-frame from the kth (k>=0) DL sub-frame after the terminal has received a random access request or has transmitted M1. Or, the RA monitoring period may be defined as until a timer starting after the random access request has been received or M1 has been transmitted expires.

The RA monitoring period may apply only to the PDCCH where the terminal schedules a PDSCH for the serving cell where M1 has been transmitted. That is, this corresponds only to the USS for scheduling the cell where M1 has been transmitted and schedule for other cells is not limited. For example, it may apply only to the PDCCH having a CIF value indicating the cell where M1 has been transmitted according to cross CC scheduling.

No ACK/NACK is transmitted for M2, and no HARQ operation may be conducted.

In a third embodiment, M2 may be transmitted only to the serving cell where M1 has been transmitted. The PDCCH of scheduling M2 may be monitored in the CSS (or including the USS of scheduling primary cell) of the physical channel for M2 that is transmitted to the primary cell. For M2 that is transmitted in the secondary cell, it may be monitored in the USS of scheduling the secondary cell. To schedule M2 that is to be transmitted in the secondary cell according to per-CC scheduling, the PDCCH may be monitored in the CSS of the secondary cell.

The terminal transmits a scheduled message (M3) using the UL grant included in M2 (S740). The following scheme is suggested to define a cell where M3 scheduled by M2 is transmitted.

In a first embodiment, regardless of the cell where M1 and/or M2 have been transmitted, M3 may be transmitted only to the primary cell. When a plurality of M2 schedules M3 in the same sub-frame, each M2 may include the same UL grant. Or, the M2s for different M1s from each other may be limited so that M3 cannot performs scheduling in the same sub-frame.

In a second embodiment, M3 may be transmitted in the cell where a corresponding M1 has been transmitted. For example, assume that the terminal transmits a random access preamble in the secondary cell with cell index 2. Even when a random access response is received in the primary cell, the terminal transmits a scheduled message in the secondary cell with cell index 2 using the UL grant included in the random access response. The random access response need not include a CIF indicating the cell where the scheduled message is transmitted.

The base station may measure a UL timing for a corresponding secondary cell. The base station transmits M2 including a TAC for adjusting the UL timing to the terminal. The terminal may apply the TAC to the secondary cell and may then transmit M3. Since a UL timing for a corresponding secondary cell may be quickly recovered, it may be advantageous for M3 to be transmitted in the cell where M1 has been transmitted.

Further, this may provide a merit in backward compatibility owing to no need to change the structure of the existing M2. M3 may be limited as the cell that belongs to the TAG in which the cell where M1 has been transmitted is included.

In a third embodiment, M3 may be transmitted in the cell where a corresponding M2 has been transmitted (the cell where the PDSCH of M2 is transmitted) or the cell indicated by the CIF included in the PDCCH for scheduling M2.

In a fourth embodiment, M2 may include the CIF indicating the cell where M3 has been transmitted.

In a fifth embodiment, M3 may be transmitted in the cell where a PDCCH for scheduling a corresponding M2 is transmitted.

Hereinafter, a random access procedure for a secondary cell considering the activated/deactivated state of the secondary cell is suggested.

When the terminal receives multi-cell configuration information, an added secondary cell is in the deactivated state. Thereafter, detecting a PDCCH for scheduling the secondary cell is not attempted until the secondary cell is activated. Further, even after the activated secondary cell is deactivated, the terminal does not attempt to detect a PDCCH for scheduling the deactivated secondary cell.

However, since a random access procedure should be performed in order to adjust UL synchronization of the secondary cell after deactivating the secondary cell, a long time may be taken until substantial UL transmission is initiated.

Accordingly, if the base station tries to establish UL sync of the secondary cell by transmitting a triggering message (which is called M0 message) for requesting start of a random access procedure of the corresponding secondary cell to the terminal even when the secondary cell is in the deactivated state, UL transmission may be achieved more quickly. M0 message is transmitted over a PDCCH.

Hereinafter, a method of monitoring M0 message for triggering transmission of a random access preamble for a secondary cell by a terminal and a subsequent random access procedure are suggested.

First Embodiment

The base station transmits M0 for triggering M1 transmission in the secondary cell on the PDCCH of the primary cell. The terminal may monitor the PDCCH in a CSS or USS.

The terminal transmits M1 in the secondary cell indicated by M0.

The base station transmits M2 in the primary cell. The terminal may monitor the PDCCH for scheduling M2 in the CSS of the primary cell.

The terminal transmits M3 in the primary cell.

Second Embodiment

The base station transmits M0 for triggering M1 transmission in the secondary cell on the PDCCH of the primary cell. The terminal may monitor the PDCCH in a CSS or USS.

The terminal transmits M1 in the secondary cell indicated by M0.

The base station transmits M2 in the primary cell. The terminal may monitor the PDCCH for scheduling M2 in the CSS of the primary cell.

M2 may include the CIF indicating the cell where M3 is transmitted. The terminal transmits M3 in the cell indicated.

Third Embodiment

The base station transmits M0 for triggering M1 transmission in the secondary cell on the PDCCH of the primary cell. The terminal may monitor the PDCCH in a CSS or USS.

The terminal transmits M1 in the secondary cell indicated by M0.

The base station transmits M2 in the primary cell. The terminal may monitor the PDCCH for scheduling M2 in the CSS of the primary cell.

The terminal transmits M3 in the cell where M1 has been transmitted.

Hereinafter, initial UL transmission in a secondary cell is suggested.

As described above, the base station may trigger UL transmission of the terminal after adjusting UL timing by making a random access procedure initiated using M0 on the secondary cell.

However, the timing when the terminal is to perform UL transmission is unclear with respect to when no UL timing has not been established (for example, before a random access procedure is performed on an added secondary cell, after the secondary cell is shifted from deactivation to activation, or when the time sync timer of the secondary cell expires).

In order to prevent a UL transmission timing from being unclear, UL transmission in the secondary cell except for transmission of a random access preamble may be prohibited before a random access procedure is initiated on the secondary cell or the TAG where the corresponding secondary cell belongs. More specifically, the state of prohibited UL transmission (or un-synchronization state) in the secondary cell may be maintained until the TAG is received after a random access preamble triggered by M0 is transmitted or until transmission of M3 is complete after the random access preamble triggered by M0 is transmitted. When escaping from the state of prohibited UL transmission, the terminal may initiate a predetermined periodic UL transmission (CSI (channel state information) report, SRS (sounding reference signal) transmission, etc.).

However, if the base station directly instructs UL transmission on a secondary cell unclear of UL synchronization or TAG to which the corresponding secondary cell belongs, the base station may be considered as having recognized no problems with the UL transmission in the corresponding secondary cell. Accordingly, in case the base station directly schedules UL transmission on the secondary cell that fails to establish UL timing and is prohibited from UL transmission, the terminal offers to perform the corresponding UL transmission. In case UL transmission is performed through direct scheduling in the state of un-synchronization, the terminal may also perform subsequent periodic or aperiodic PUCCH/PUSCH transmission on the corresponding secondary cell or the TAG to which the corresponding secondary cell belongs.

Similarly, the terminal receiving the TAC for the secondary cell that is in the unsynchronized state and applying the received TAC to the secondary cell, the base station is considered as having recognized UL timing of the secondary cell, so that the terminal may transmit a PUCCH/PUSCH on the corresponding secondary cell or TAG to which the corresponding secondary cell belongs.

Hereinafter, a method of eliminating unclearness of the UL transmission timing of a secondary cell is suggested.

Firstly, the terminal may perform PDCCH monitoring in order to receive M0 also for a cell, which is a deactivated cell or a cell belonging in a TAG corresponding to secondary cell. The specific cell may be assigned to the terminal by the base station using RRC signaling.

In case the deactivated state on the secondary cell lasts long, the terminal may lose the UL transmission timing. The terminal monitors a PDCCH for M0 triggering a random access procedure in order to rapidly initiate a random access procedure even on the deactivated secondary cell. The PDCCH may be monitored in the search space in the deactivated secondary cell or may be monitored in the search space in the activated cell.

Monitoring M0 for the deactivated secondary cell may be performed when the terminal determines to lose the UL synchronization, when the timing sync timer expires, or after the secondary cell is added and before the added secondary cell is activated.

Second, the base station may instruct to perform UL synchronization of the terminal when the secondary cell is activated.

The base station may transmit a first bit indicating activation/deactivation of the secondary cell and a second bit indicating whether to perform UL synchronization to the terminal. For example, the second bit being '1' denotes that the terminal performs UL transmission after completing activation of the secondary cell and UL synchronization. The second bit being '0' denotes that the terminal performs UL transmission immediately after the secondary cell is activated without UL synchronization.

Additionally, the base station may provide the terminal with information on a random access resource in addition to the first and second bits. When the second bit indicates UL synchronization, the random access resource is used to perform an initial random access procedure.

Figure 8:
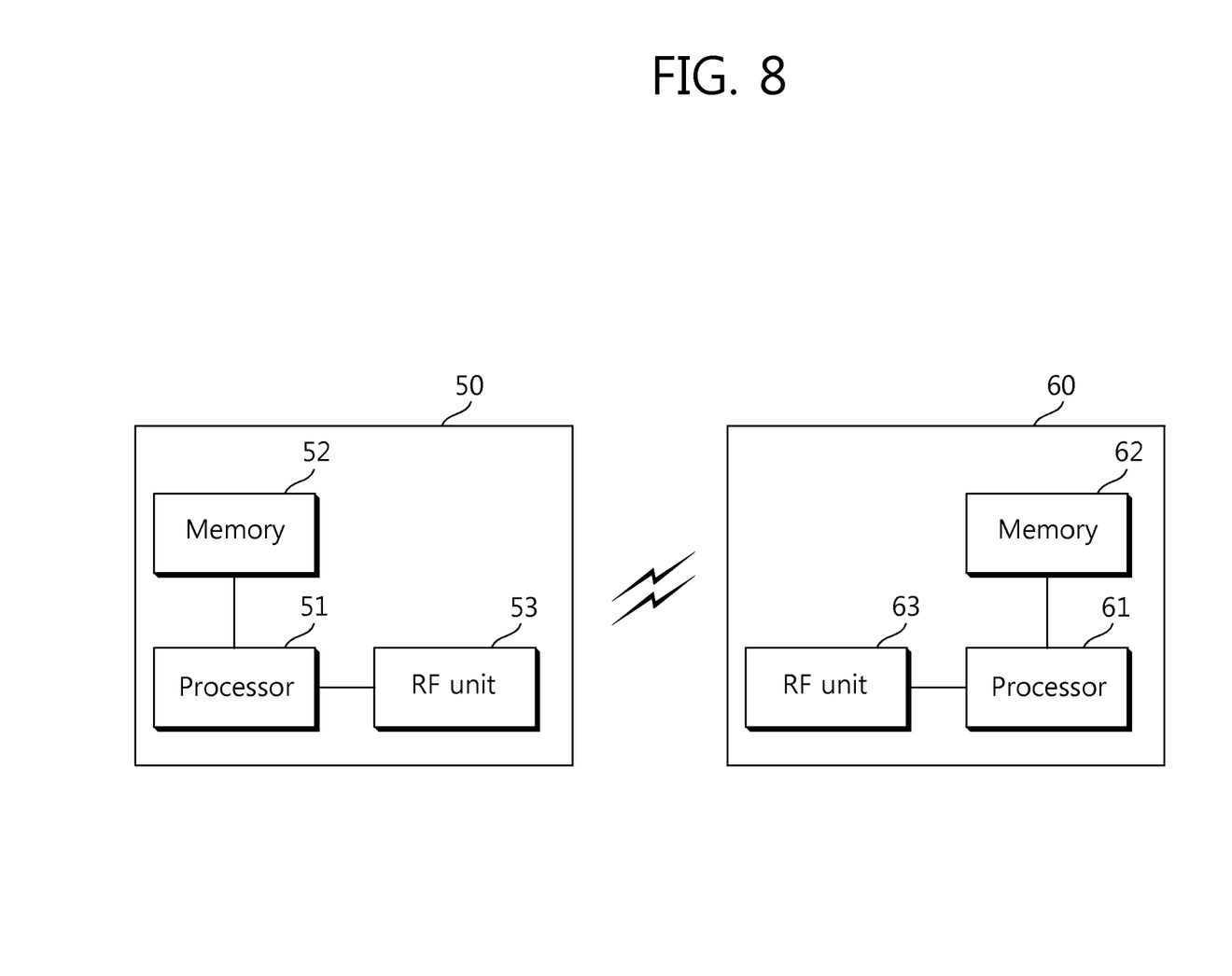
FIG. 8 is a block diagram illustrating a wireless communication system in which an embodiment of the present invention is implemented.

FIG. 8 is a block diagram illustrating a wireless communication system in which an embodiment of the present invention is implemented.

A base station 50 includes a processor 51, a memory 52, and an RF (radio frequency) unit 53. The memory 52 is connected to the processor 51 and stores various pieces of information to drive the processor 51. The RF unit 53 is connected with the processor 51 and transmits and/or receives radio signals. The processor 51 implements a suggested function, process, and/or method. In the above-described embodiments, the operation of the base station may be implemented by the processor 51.

A wireless device 60 includes a processor 61, a memory 62, and an RF unit 63. The memory 62 is connected with the processor 61 and stores various pieces of information to drive the processor 61. The RF unit 63 is connected with the processor 61 and transmits and/or receives radio signals. The processor 61 implements a suggested function, process, and/or method. In the above-described embodiments, the operation of the terminal may be implemented by the processor 61.

The processor may include an ASIC (application-specific integrated circuit), a chipset, a logic circuit and/or a data processing device. The memory may include a ROM (read-only memory), a RAM (random access memory), a flash memory, a memory card, a storage medium and/or other storage devices. The RF unit may include a baseband circuit for processing radio signals. When an embodiment is implemented in software, the above-described schemes may be embodied in modules (processes, or functions) for performing the above-described functions. The modules may be stored in the memory and may be executed by the processor. The memory may be positioned in or outside the processor and may be connected with the processor via various well-known means.

In the above-described system, the methods are described in flowcharts with a series of steps or blocks, but the present invention is not limited to the order of the steps. Some steps may be performed simultaneously or in a different order from others. Further, it will be understood by those of ordinary skill in the art that other steps may be non-exclusively included in each flowchart or some steps in the flowchart may be deleted without affecting the scope of the present invention.

What is claimed is:

1. A method of performing a random access procedure in a wireless communication system, the method comprising:
   receiving, by a terminal, multi-cell configuration information configuring at least one secondary cell (SCell);
   receiving, by the terminal, activation information activating one of the at least one SCell;
   transmitting, by the terminal, a random access preamble in the activated SCell;
   receiving, by the terminal, a random access response including an uplink resource allocation in a primary cell (PCell), wherein the random access response includes a carrier indicator field (CIF) indicating a specific cell in which a scheduled message will be transmitted, and wherein the CIF is only included in the random access response when the random access preamble is transmitted in the activated SCell; and
   transmitting, by the terminal, the scheduled message using the uplink resource allocation in the specific cell indicated by the CIF included in the random access response.

2. The method of claim 1, wherein the random access response further includes a TAC (Timing Advance Command) for uplink time alignment.

3. The method of claim 2, wherein the TAC is applied to the activated SCell.

4. The method of claim 2, wherein the TAC is applied to the PCell and the activated SCell.

5. The method of claim 1, wherein the multi-cell configuration information and the activation information are received in the PCell.

6. The method of claim 1, wherein a cell index of the PCell is 0, and a cell index of the at least one SCell is larger than 0.

7. The method of claim 1, further comprising:
   receiving, by the terminal, an indicator triggering transmission of the random access preamble.

8. The method of claim 7, wherein the indicator is received in the activated SCell.

9. The method of claim 7, wherein the indicator is received in the PCell.

10. An apparatus performing a random access procedure in a wireless communication system, the apparatus comprising:
    an RF (radio frequency) unit configured to transmit and receive a radio signal; and
    a processor connected with the RF unit,
    wherein the processor is configured to:
      receive multi-cell configuration information configuring at least one secondary cell (SCell),
      receive activation information activating one of the at least one SCell,
      transmit a random access preamble in the activated SCell,
      receive a random access response including an uplink resource allocation in a primary cell (PCell), wherein the random access response includes a carrier indicator field (CIF) indicating a specific cell in which a scheduled message will be transmitted, and wherein the CIF is only included in the random access response when the random access preamble is transmitted in the activated SCell, and
      transmit the scheduled message using the uplink resource allocation in the specific cell indicated by the CIF included in the random access response.

11. The apparatus of claim 10, wherein the random access response further includes a TAC (Timing Advance Command) for uplink time alignment.

12. The apparatus of claim 11, wherein the TAC is applied to the activated SCell.

13. The apparatus of claim 11, wherein the TAC is applied to the PCell and the activated SCell.

14. The apparatus of claim 10, wherein the multi-cell configuration information and the activation information are received in the PCell.

* * * * *